United States Patent [19]
Aoki

[11] Patent Number: 4,623,978
[45] Date of Patent: Nov. 18, 1986

[54] PRINT CONTROL APPARATUS HAVING LINE BUFFER

[75] Inventor: Hiroyuki Aoki, Hanno, Japan

[73] Assignee: Kabushiki Kaisha Toshiba, Kawasaki, Japan

[21] Appl. No.: 696,100

[22] Filed: Jan. 29, 1985

[30] Foreign Application Priority Data

Jan. 31, 1984 [JP] Japan ................................ 59-15475
Jan. 31, 1984 [JP] Japan ................................ 59-15498

[51] Int. Cl.$^4$ ............................................ B41B 27/08
[52] U.S. Cl. ................................ 364/519; 346/139 R; 346/154; 364/523
[58] Field of Search ............................. 364/518–520, 364/523; 346/154, 139 R; 400/118; 358/296

[56] References Cited

U.S. PATENT DOCUMENTS 4,542,384 9/1985 Tazaki ................................ 364/518

FOREIGN PATENT DOCUMENTS 2113153A 8/1983 United Kingdom ................ 364/523

Primary Examiner—A. Evans
Attorney, Agent, or Firm—Cushman, Darby & Cushman

[57] ABSTRACT

According to a print control apparatus of a printer which has a line buffer, when one-line data transmitted from a host CPU includes a character and a figure, a print and line feed controller causes a character image generator to access a character pattern memory so as to write the readout a character image in the line buffer. The print and line feed controller causes a figure image generator to generate a figure image which is then ORed-written on the character image. As a result, one-line character and figure data can be printed with one scanning operation. Figure data parameters are stored in the parameter area in the internal memory. Every time printing of a page is performed in units of predetermined dot widths, the parameter corresponding to the figure image developed into the line buffer is deleted from the parameter area. The next parameter is then stored in the parameter area.

2 Claims, 8 Drawing Figures

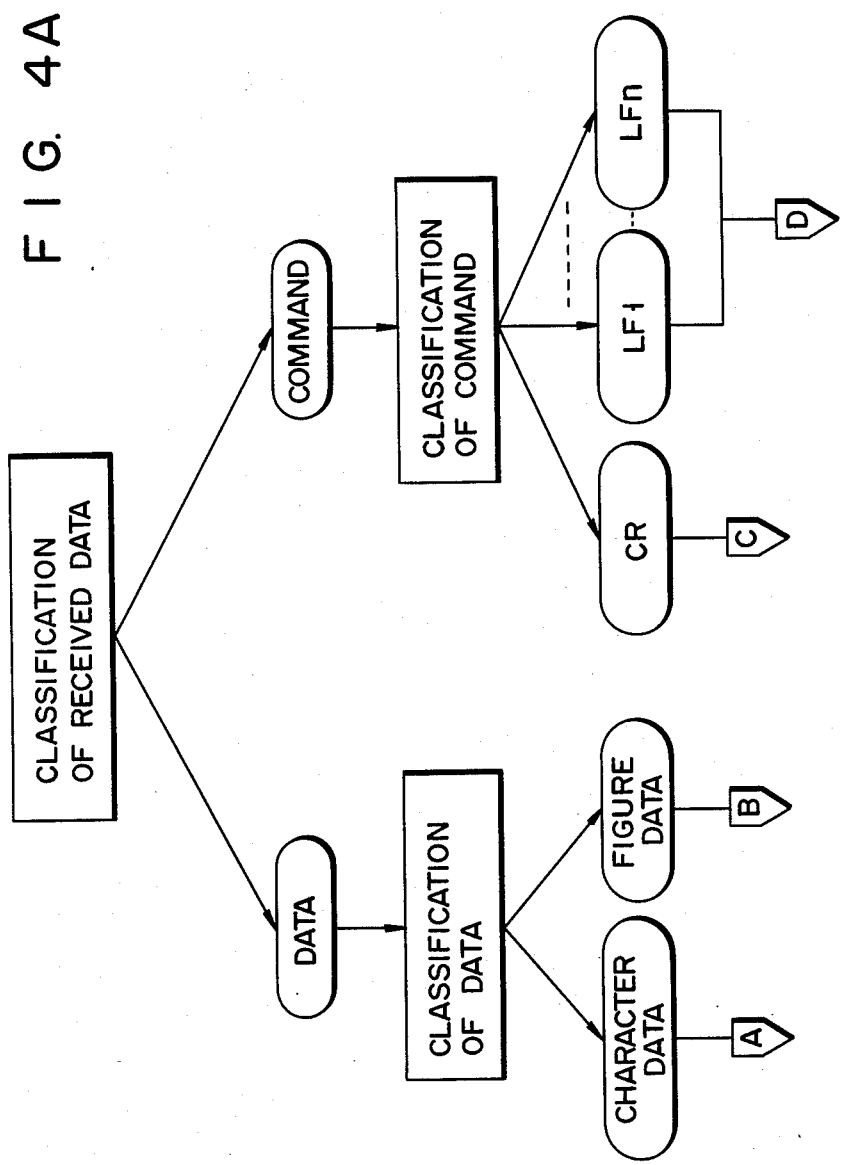

PRINT CONTROL APPARATUS HAVING LINE BUFFER

BACKGROUND OF THE INVENTION

The present invention relates to a printer control apparatus which has a figure image generating means for generating a figure image in accordance with parameters of figure data and which is used in a printer for developing print image data in a line buffer in units of lines and printing out the print image.

In a conventional processing apparatus dealing with characters and figures such as a wordprocessor, when character and figure images are printed by a printer or the like, these print images are developed in a page memory in units of pages and are sequentially read out in synchronism with the print operation and printed by the printer. However, since such a print control means stores image data in units of pages, a large-capacity page memory is required, resulting in high cost. In order to solve this problem, a conventional apparatus is known wherein figure data is given by parameters and, figure images are developed into the line buffer. However, according to this apparatus, character and figure images are independently developed into the line buffer at different line print timings. Because of this, a single line is scanned twice, and therefore, it takes a long print time to complete printing of all the pages.

Furthermore, the conventional apparatus is arranged such that parameters of figure data are written in a specific memory area (a parameter area) in units of pages, and the parameters corresponding to the line positions are sequentially read out in synchronism with the print operation, thereby generating the figure image.

With this arrangement, when the number of figures to be printed on one page is not specified, a large memory area must be assigned as the parameter area. On the other hand, when the storage capacity of the parameter area is limited, the number of figures to be printed on one page is also limited.

SUMMARY OF THE INVENTION

It is an object of the present invention to eliminate the conventional drawbacks described above and to provide a printer control apparatus capable of simultaneously printing characters and figures when they occur on the same line, thereby greatly decreasing the page print time.

It is another object of the present invention to provide a printer control apparatus wherein the number of figures that can be stored is not limited even if a storage capacity of a parameter area thereof is limited.

In order to achieve the above objects of the present invention, there is provided a print control apparatus of a printer, which is connected to a host computer to print an image in accordance with data transmitted from the host computer, comprising:

a character pattern memory having a character pattern;

a line buffer for storing a print image in units of lines;

a character image generator for receiving a character code and developing a character image into the line buffer;

a figure image generator for receiving a parameter of the figure data and ORed-writing the figure image on the character image in the line buffer in response to a control signal from a character and figure combining controller;

a print and line feed controller for receiving data from the host computer and controlling the character image generator, the figure image generator and the character and figure combining controller in such a manner that printing and line feeding are performed so as to print one-line characters and figures on the same line with one scanning; and a character and figure combining controller for analyzing data supplied from the print and line feed controller, for discriminating whether or not the figure data is to be printed on a line having a character represented by the analyzed data, and, if so, supplying to the figure image generator a command that the figure image is to be ORed written on the character image in the line buffer.

BRIEF DESCRIPTION OF THE DRAWINGS

Other objects and features of the present invention will be apparent from the following description taken in connection with the accompanying drawings, in which:

FIGS. 4A through 4C are respectively flow charts for explaining the operation of a print and line feed controller 20;

DETAILED DESCRIPTION OF THE PREFERRED EMBODIMENT

Figure 1:
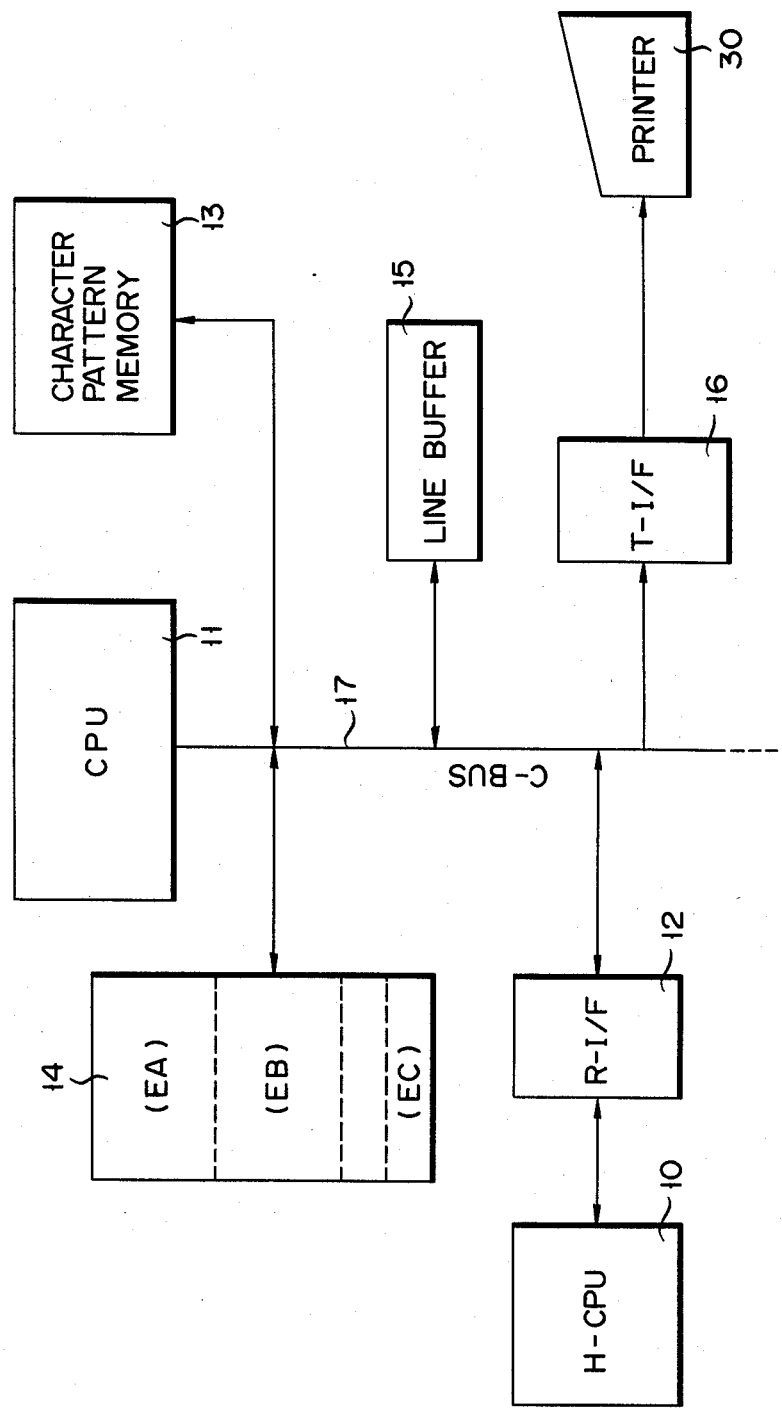
FIG. 1 is a block diagram showing the hardware configuration of a printer control apparatus according to an embodiment of the present invention.

Referring to FIG. 1, a printer control apparatus of the present invention has a central processing unit (CPU) 11. The CPU 11 is connected to a common bus (C-BUS) 17. A character pattern memory 13, an internal memory 14, a line buffer 15, a receive interface (R-I/F) 12, and a transmit interface (T-I/F) 16 are connected to the C-BUS 17. A host computer (H-CPU) 10 is connected to the R-I/F 12. A printer 30 is connected to the T-I/F 16. The R-I/F 12 receives different types of print data from the H-CPU 10 and supplies them to the CPU 11 through the C-BUS 17. The character pattern memory 13 converts the character code from the H-CPU 10 to a character image (character pattern) in accordance with the input character code. The internal memory 14 has a control program area (EA) for storing a control program which controls the CPU 11, a figure image generation program area (EB) and a figure generation parameter memory area (to be referred to a parameter area EC). The line buffer 15 stores one-line image (dot pattern data) data. The T-I/F 16 sends the image from the line buffer 15 to the printer 30. The printer 30 comprises a serial printer which does not perform reverse line feeding.

Figure 2:
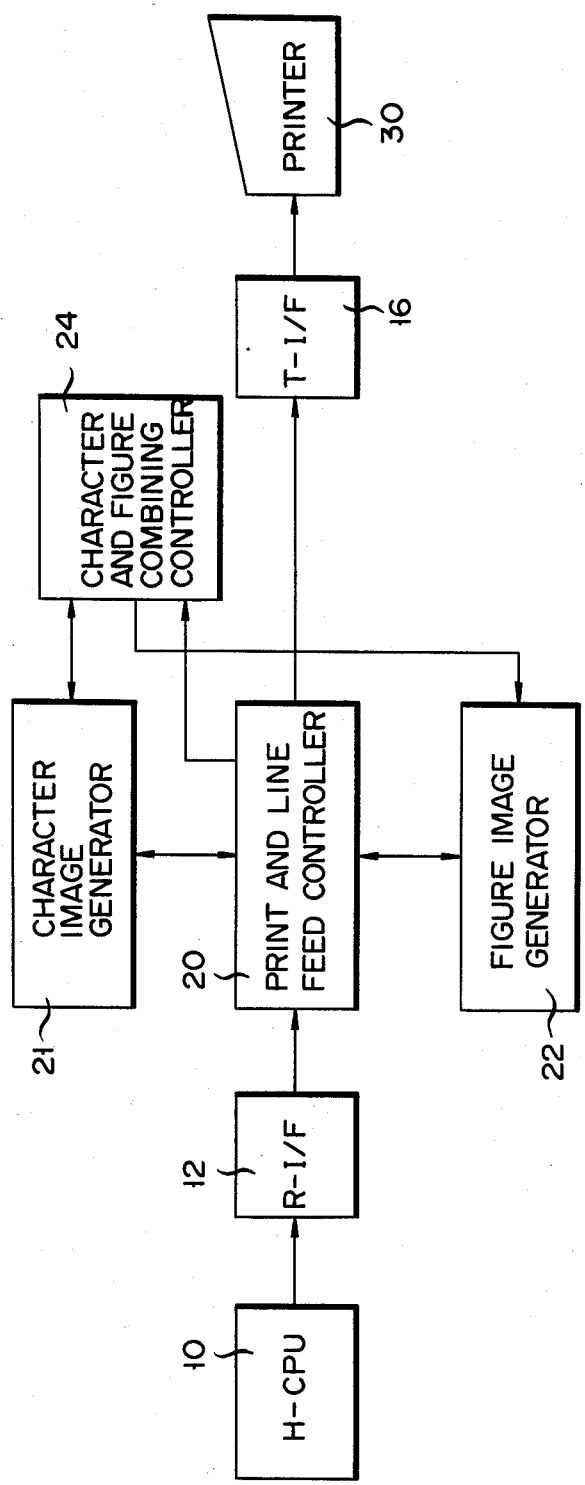
FIG. 2 is a control block diagram showing the main part of the apparatus shown in FIG. 1.

FIG. 2 is a detailed control block diagram of the apparatus (FIG. 1) for printing out characters and figures with one printing operation.

A print and line feed controller 20 receives different types of print data received by the R-I/F 12 and performs control operations including development control of the print image, print execution control and paper feed control. A character image generator 21 is connected to the print and line feed controller 20 and generates a character image corresponding to a character code supplied from the print and line feed controller 20. A figure image generator 22 is connected to the print and line feed controller 20 and generates a figure image corresponding to a parameter of figure data supplied from the print and line feed controller 20. A method of sequentially generating figure images into the line buffer without using a page memory is described in a patent application by the present applicant. For example, circle graph image generation is described in "System for Printing Circle Graph" in Japanese Patent Application No. 57-060543 (filed on Apr. 12, 1984). According to this invention, a plurality of registers are arranged to store circle and line dot patterns to be stored in the line buffer memory and addresses of the line buffer memory. By operating these registers, the dot pattern data of a circle graph is directly stored in the line buffer memory.

Generation of a graph of a broken line is described in "System for Generating Graph of Broken Line" in Japanese Patent Application No. 57-067195 (filed on Apr. 23, 1984). According to this invention, the system has a line buffer, a register section and a control section. The line buffer has predetermined addresses and a predetermined bit length. The register section comprises a plurality of register blocks. Each register block comprises a first register for storing an address of the line buffer which represents a start point of the graph of broken line, a second register for storing a start point pattern of the graph of broken line, and a third register for storing vertical position data of the start point of the graph of broken line. The control section sequentially generates patterns of a graph of broken line in accordance with the input data. The data address, the data pattern, and the vertical position data of the graph of broken line in the line buffer are calculated in accordance with the generated pattern data, and the calculated data are respectively stored in the first to third registers. Thereafter, the data is read out from the register section and is written in the line buffer.

In addition, generation of a bar graph and a shaded image is described in "System for Generating Bar Graph and Shaded Pattern" in Japanese Patent Application No. 57-067196 (filed on Apr. 23, 1984). This system comprises a line buffer, a register section and a control section. The line buffer has predetermined addresses and a predetermined bit length. The register section comprises a plurality of register blocks. Each register block comprises a first register for storing the address of the line buffer which represents a start point of the bar graph and the shaded pattern, a second register for storing the start point pattern of the bar graph and the shaded image, and a third register for storing vertical position data of the start point of the bar graph and the shaded pattern. The control section sequentially generates patterns of the bar graph and the shaded pattern in accordance with the input data. When the patterns are sequentially generated, the addresses of the line buffer which represent the data of the bar graph and the shaded pattern, the patterns of the bar graph and the shaded images, and the vertical position data are calculated in accordance with the pattern data, and the calculated data are respectively stored in the first to third registers. Thereafter, the data is read out from the register section and is written in the line buffer.

A character and figure image combining controller 24 discriminates whether or not a figure is to be printed on a line having characters. If so, the character and figure image combining controller 24 supplies a command to the figure image generator 22 to ORed-write the figure image with the character image in the line buffer 15.

Figure 3:
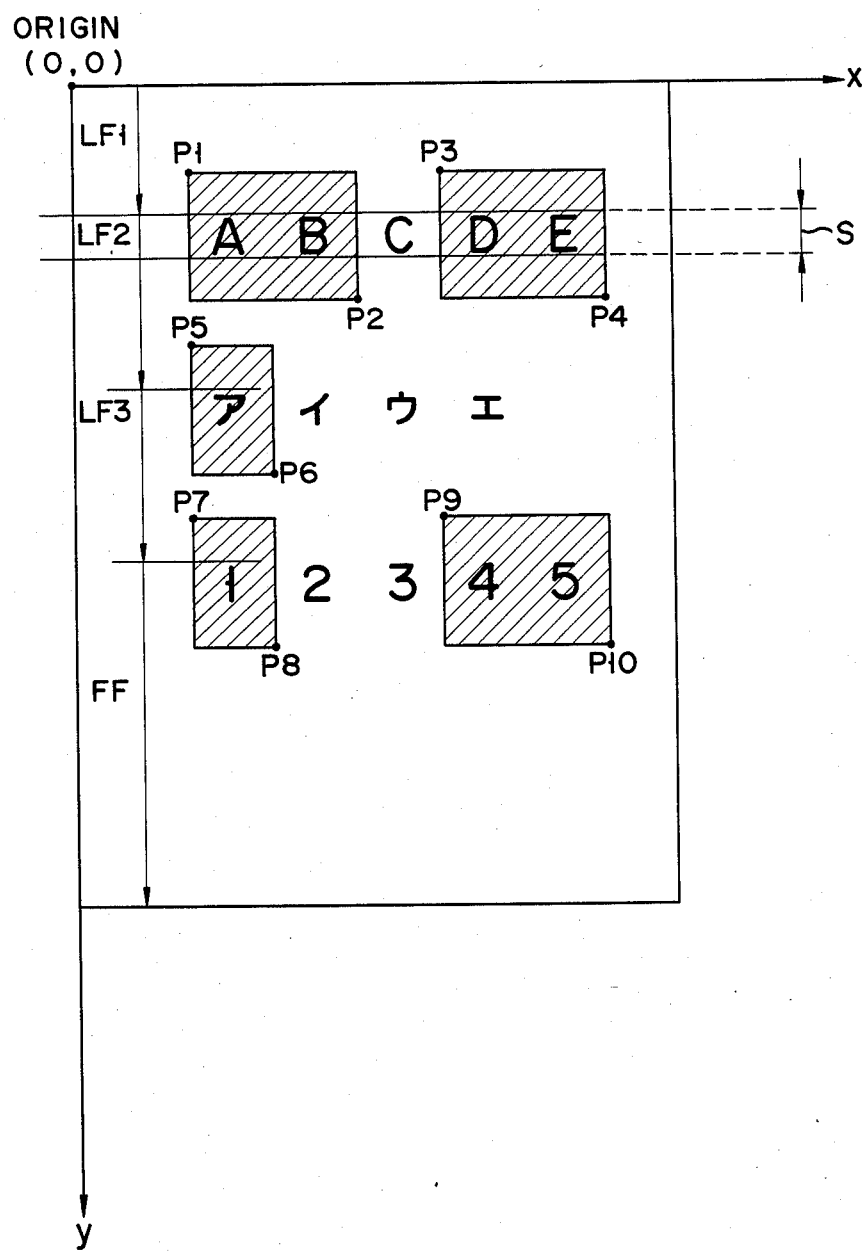
FIG. 3 is a representation for explaining the operation of the apparatus shown in FIG. 1.

FIG. 3 is a representation for explaining the operation of the apparatus shown in FIG. 1. Reference symbol S denotes a print range (i.e., printing head width, e.g., 24-dot width) for one printing operation. Reference symbols P1 to P10 denote coordinate points representing the corners (parameters) of the respective figures. Reference symbol LFi (i=1, 2, 3) denotes a line feed; and FF, a page feed.

The operation of the apparatus according to this embodiment will be described in detail.

The print and line feed controller 20 receives data from the H-CPU 10 through the R-I/F 12 under the control of the control program EA stored in the internal memory. The print and line feed controller 20 discriminates whether the received data is image data shown in FIG. 4A or a command. If the received data is discriminated to be image data, the print and line feed controller 20 further discriminates whether the image data is character data or figure data. However, when the received data is discriminated to be a command, the controller 20 further discriminates whether this represents a carriage return or line feed (LFn indicates that line feeding is performed by n lines) command.

Figure 4B:
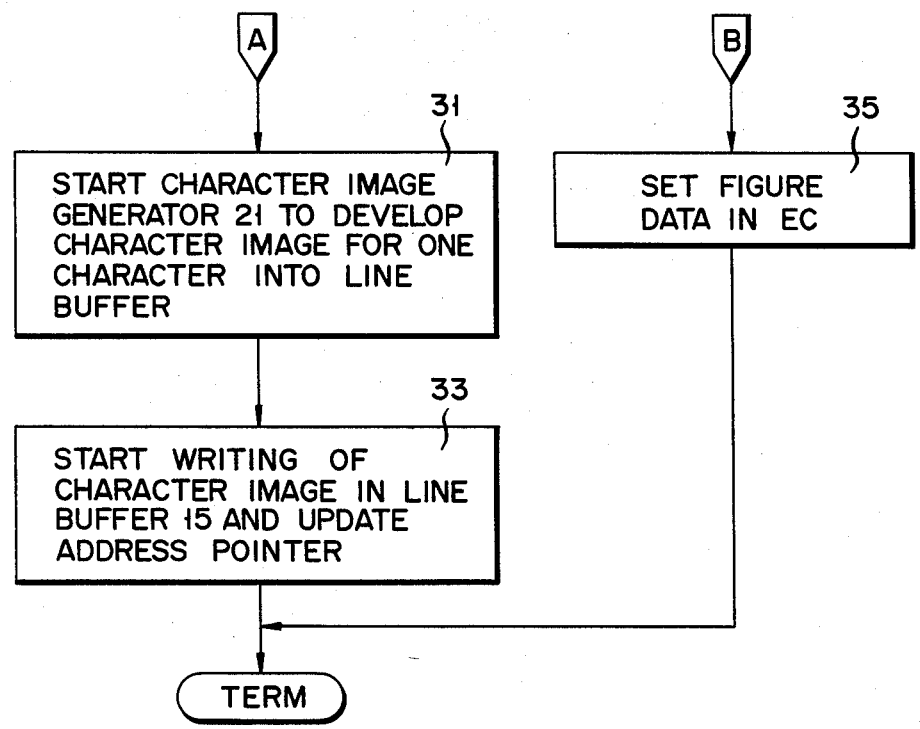

When data received by the print and line feed controller 20 is discriminated to be character data, in step 31 of FIG. 4B, the character image generator 21 is started, and one-character image is developed into the line buffer 15. In step 33, a character image write start address pointer in the line buffer 15 is updated.

However, when the image data is discriminated to be figure data, the print and line feed controller 20 sets the figure data in the parameter area (EC) in the internal memory 14 of FIG. 1, in step 35 of FIG. 4B.

Figure 4C:
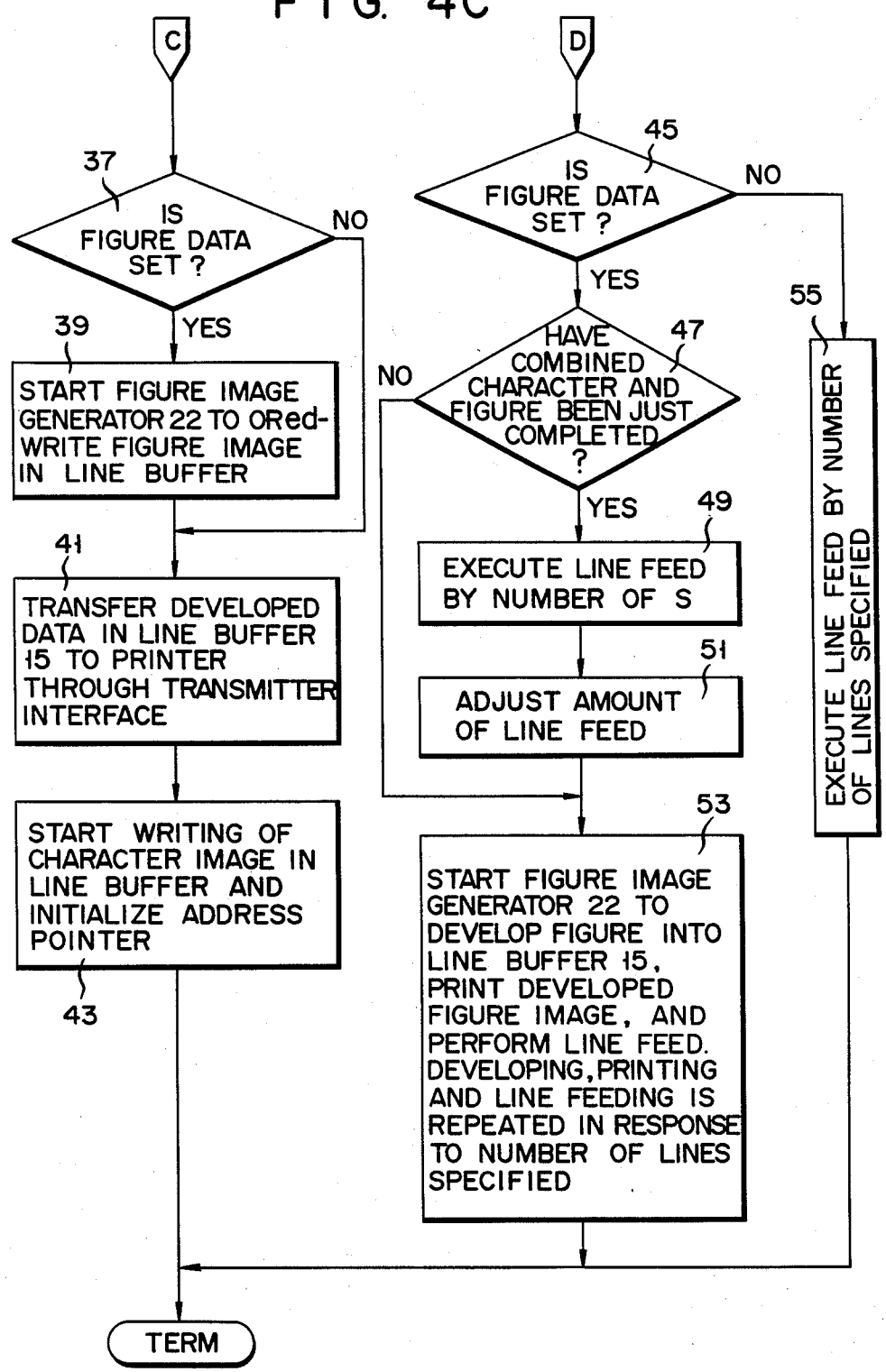

When the received data is discriminated to be a carriage return (print start) command, the print and line feed controller 20 checks in step 37 of FIG. 4C whether or not the figure data is set. If YES in step 37, the figure image generator 22 is started to ORed-write the figure image in the line buffer 15 in step 39. In step 41, the image developed into the line buffer 15 is supplied to the printer 30 through the T-I/F 16. In step 43, a character image write start address pointer in the line buffer 15 is initialized.

However, when the received data is discriminated to be a line feed command, the print and line feed controller 20 checks in step 45 whether or not the figure data is set. If YES in step 45, the flow advances to step 47. The controller 20 checks in step 47 whether or not the character and the figure have been combined. If YES in step 47, "S" number of line feeding is performed in step 49. This line feeding will be later described in detail with reference to FIG. 5. In step 53, the figure image generator 22 is started to develop the figure into the line buffer 15, print the developed figure image and perform line feeding. Development, printing and line feeding are repeated in response to the number of lines specified.

When the figure data is not set, line feeding is performed by the number of lines specified.

A detailed operation will be described with reference to FIG. 3, wherein a "shaded" figure image is registered and processed. When the print and line feed controller 20 receives one-line print data from the H-CPU 10 through the R-I/F 12, the controller 20 supplies a control signal to the character and figure combining controller 24. The character and figure image combining controller 24 checks if the print data includes character data and figure data. When the print and line feed controller 20 receives from the character and figure combining controller 24 information representing that the print data includes character and figure data, the character image generator 21 is started. The character image generator 21 causes the character pattern memory 13 to read out a character dot pattern corresponding to the input character code. The readout character dot pattern is developed into the line buffer 15. In the case shown in FIG. 3, the respective character images which constitute a character pattern "ABCDE" are dot-developed into the line buffer 15. Subsequently, the figure image generator 22 is started by the line feed controller 20. The figure image generator 22 generates a figure dot pattern corresponding to the input parameter. The print and line feed controller 20 receives a figure dot pattern from the figure image generator 22 and performs an ORed-write operation wherein the figure dot pattern is superposed on the character dot pattern in the line buffer 15. In the case shown in FIG. 3, in the line buffer 15, the shaded pattern is ORed-written on the character pattern "ABCDE" written in the line buffer 15 in such a manner that the dot positions of the shaded pattern respectively correspond to those of the character pattern "ABCDE". As a result, in the line buffer 15, one-line character image is combined with the figure image. The print and line feed controller 20 supplies the image held in the line buffer 15 to the printer 30 through the T-I/F 16. As a result, the printer prints one line of a combined figure and character with one printing operation. One-line printing is repeated up to the end of page. As a result, the number of times of movement of the printing head can be greatly decreased, thereby greatly shortening the time required to print one page.

Figure 5:
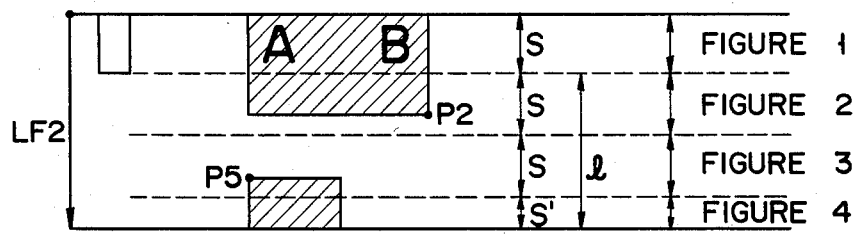
FIG. 5 is a representation for explaining line feeding in the apparatus shown in FIG. 1.

With the command LF2 of FIG. 3 to print the characters "A" and "B" of FIG. 5, the portion represented by FIG. 1 is ORed-written in the line buffer 15, so that this portion is already printed. With the line feed command LF2, a portion corresponding to S is subjected to line feeding. A combination of the operation of the figure image generator 22, figure printing, and line feeding is repeated for a remaining number of lines l. In the case shown in FIG. 5, the figure image generator 22 prints twice with a width of S and finally with a width of S'.

Figure 6:
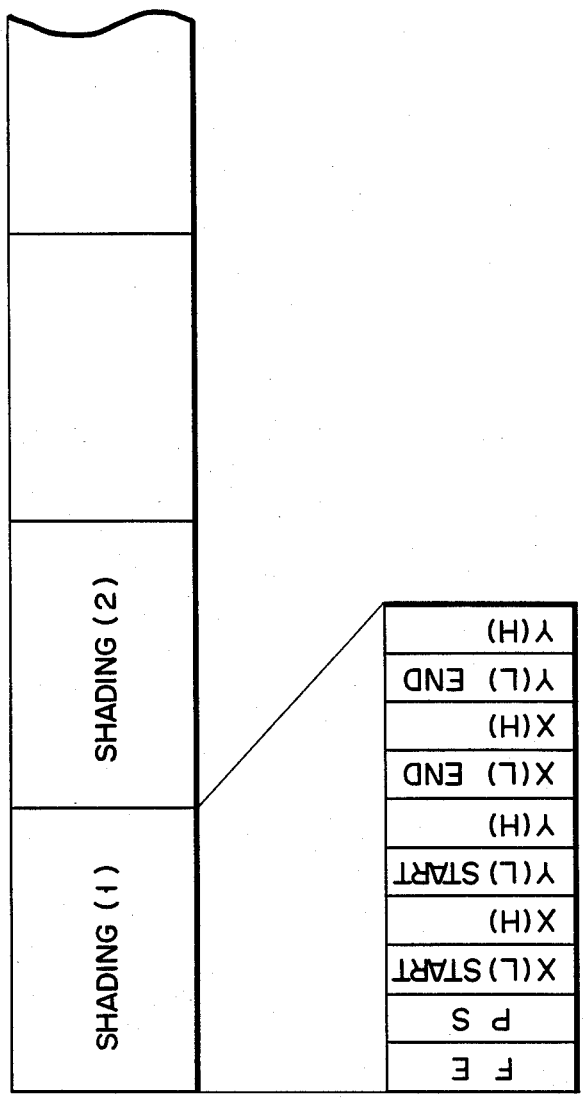
FIG. 6 is a format showing the structure of a parameter area (EC).

FIG. 6 shows the figure data structure set in the parameter area EC in the internal memory 14. Reference symbol FE denotes a developing status flag; and PS, pattern identification data.

When the print and line feed controller 20 receives a print command from the H-CPU 10 through the R-I/F 12, the controller 20 supplies position data of the printed page to the H-CPU 10 so as to receive character and figure data to be printed. When a figure parameter is present in the print data received by the print and line feed controller 20, this parameter is set in the parameter area EC in the internal memory 14. The figure image generator 22 is started by the print and line feed controller 20 to generate a figure image corresponding to this parameter. The resultant figure dot image is developed into the line buffer 15. When dot development of the parameter set in the parameter area EC is completed, the print and line feed controller 20 sends the next position data of the page to the H-CPU 10. Thus, the print and line feed controller 20 receives the next print data to be developed. More particularly, the CPU 11 performs the following operations:

(i) Shading parameters (P1,P2) and (P3,P4) are set in the parameter area EC.

(ii) The print and line feed controller 20 causes the figure image generator 22 to generate a shaded image in accordance with the parameters (P1,P2) and (P3,P4), and the generated shaded image is developed into the line buffer 15.

(iii) The CPU 11 checks that all the developing status flags FE attributed to the respective parameters in the parameter area EC represent the end status.

(iv) The line feed command LF1 is executed.

(v) A character image is generated in accordance with the character code (ABCDE) and is developed into the line buffer 15. Thereafter, the carriage return (CR) command is executed.

(vi) The figure (shading) parameters P5 and P6 are set in the parameter area EC. A figure (shaded) image is generated by the figure image generator 22 in accordance with the parameters P5 and P6 stored in the parameter area EC. The resultant halftone image is developed into the line buffer 15.

(vii) The CPU 11 checks that all the developing status flags FE attributed to the parameters stored in the parameter area EC represent the end status.

(viii) The command LF2 is executed.

(ix) A character image is generated by the character image generator 21 in accordance with a character code (アイウエ) and is developed into the line buffer 15. Thereafter, the carriage return (CR) command is executed.

(x) Figure (shaded) parameters (P7,P8) and (P9, P10) are set in the parameter area EC.

A figure (shaded) image is generated by the figure image generator 22 in accordance with the parameters (P7,P8) and (P9,P10) stored in the parameter area EC and is dot-developed into the line buffer 15.

The CPU 11 then checks that all the developing status flags FE attributed to the parameters stored in the parameter area EC represent the end status.

(xi) The command LF3 is executed.

(xii) A character image is generated by the character image generator 21 in accordance with a character code (12345), and the generated character code is developed into the line buffer 15. Thereafter, the carriage return command is executed.

(xiii) The page feed (FF) command is executed.

After the command LF2 is executed, printing for the figure (shading) parameters (P1, P2) and (P3, P4) is completed. Therefore, other figure (shading) parameters (P7,P8) and (P9,P10) can be registered in the parameter area EC. In the above case, only three figure parameter memory regions need be provided in the parameter area EC. As compared with the conventional system, the space required for the parameter area can be greatly decreased. Therefore, an unlimited number of figures can be registered and printed.

In the above embodiment, a shaded image is used as the figure image. However, the same process can be applied to a maximum number of figures when data includes data of a circle, an ellipse, a sector, or a diagonal line. In this case, control may be performed such that data in the parameter area EC may be replaced with other data when the corresponding figure is printed.

What is claimed is:

1. A print control apparatus of a printer which is connected to a host computer to print an image in accordance with data transmitted from said host computer, comprising:

a character pattern memory having a character pattern;

a line buffer for storing a print image in units of lines;

a character image generator for receiving a character code and developing a character image into said line buffer;

a character and figure combining controller;

a figure image generator for receiving a parameter of the figure data and ORed-writing the figure image on the character image in said line buffer in response to a control signal from said character and figure combining controller; and a print and line feed controller for receiving data from said host computer and controlling said character image generator, said figure image generator and said character and figure combining controller in such a manner that printing and line feeding are performed so as to print one-line characters and figures on the same line with one scanning;

said character and figure combining controller for analyzing data supplied from said print and line feed controller, for discriminating whether or not the figure data is to be printed on a line having a character represented by the analyzed data, and, if so, supplying to said figure image generator a command that the figure image is to be ORed-written on the character image in said line buffer.

2. A print control apparatus of a printer which is connected to a host computer to print an image in accordance with data transmitted from said host computer, comprising:

a character pattern memory having a character pattern;

a line buffer for storing a print image in units of lines;

an internal memory having at least a figure generation parameter area;

a character image generator for receiving a character code, reading a corresponding character image from said character pattern memory and developing the readout character image into said line buffer; a character and figure combining controller;

a figure image generator for receiving figure data, extracting a corresponding figure parameter from said figure generation parameter area, generating a figure image corresponding to the readout figure parameter, and ORed-writing the figure image on the character image stored in said line buffer; and a print and line feed controller for controlling printing and line feeding so as to receive data transmitted from said host computer, reading out from said internal memory a parameter corresponding to the figure image developed into said line buffer for each end of a predetermined dot-width printing within a page by controlling said character image generator, said figure image generator, and said character and figure combining controller, storing a parameter of a next figure in said figure generation parameter area, and sequentially setting parameters of figure data to be printed for each predetermined dot-width printing within the page;

said character and figure combining controller analyzing data transmitted from said print and line feed controller, discriminating whether or not the figure data is to be printed on a line having a character represented by the analyzed data, and, if so, supplying to said figure image generator a command that the figure image is to be ORed-written on the character image in said line buffer.

* * * * *